US012516751B2

(12) United States Patent
Wang et al.

(10) Patent No.: US 12,516,751 B2
(45) Date of Patent: Jan. 6, 2026

(54) VALVE FAULT DETECTION METHOD AND APPARATUS

(71) Applicant: YANTAI JEREH OILFIELD SERVICES GROUP CO., LTD., Yantai (CN)

(72) Inventors: Xinmeng Wang, Yantai (CN); Zongwen Wang, Yantai (CN); Tao Li, Yantai (CN); Minghua Sun, Yantai (CN)

(73) Assignee: Yantai Jereh Oilfield Services Group Co., Ltd., Yantai (CN)

( * ) Notice: Subject to any disclaimer, the term of this patent is extended or adjusted under 35 U.S.C. 154(b) by 296 days.

(21) Appl. No.: 18/179,928

(22) Filed: Mar. 7, 2023

(65) Prior Publication Data

US 2023/0220929 A1 Jul. 13, 2023

Related U.S. Application Data

(63) Continuation of application No. PCT/CN2022/090145, filed on Apr. 29, 2022.

(30) Foreign Application Priority Data

Dec. 10, 2021 (CN) .......................... 202111507167.3

(51) Int. Cl.
F16K 37/00 (2006.01)
G01M 13/003 (2019.01)
G06N 3/047 (2023.01)

(52) U.S. Cl.
CPC ....... *F16K 37/0083* (2013.01); *G01M 13/003* (2019.01); *G06N 3/047* (2023.01)

(58) Field of Classification Search
None
See application file for complete search history.

(56) References Cited

U.S. PATENT DOCUMENTS

| 4,580,941 A | 4/1986 | Inaba et al. |
| 9,841,017 B1 | 12/2017 | Blood et al. |
| (Continued) | | |

FOREIGN PATENT DOCUMENTS

| CN | 201175889 Y | 1/2009 |
| CN | 102922282 A | 2/2013 |
| (Continued) | | |

OTHER PUBLICATIONS

English translation of CN110533167A provided by ip.com (Year: 2025).*

(Continued)

*Primary Examiner* — Mark A Shabman
(74) *Attorney, Agent, or Firm* — Sheppard Mullin Richter & Hampton LLP

(57) ABSTRACT

A valve fault detection method includes: constructing a valve fault indicator system reflecting characteristics of vibration signals of valve states; establishing an LSTM-AE model by using an LSTM deep model and according to an autoencoder principle, and setting a fault discrimination threshold; inputting training data into the LSTM-AE model based on the valve fault indicator system, to train the LSTM-AE model; and inputting detection data of a to-be-detected valve into the trained LSTM-AE model based on the valve fault indicator system, and comparing an output value obtained by the LSTM-AE model with the set fault discrimination threshold, to judge whether the detected valve is faulty and outputting a first judgment result.

17 Claims, 6 Drawing Sheets

(56) References Cited

U.S. PATENT DOCUMENTS

| | | | |
|---|---|---|---|
| 2014/0094961 | A1 | 4/2014 | Zhao |
| 2018/0172556 | A1* | 6/2018 | Patanian ............... G05B 23/02 |
| 2018/0326582 | A1 | 11/2018 | Yokoyama et al. |
| 2019/0042935 | A1* | 2/2019 | Deisher .................... G06F 5/01 |
| 2019/0046283 | A1 | 2/2019 | Nagao et al. |
| 2019/0107463 | A1* | 4/2019 | Suga .................. G01M 13/003 |
| 2020/0108497 | A1 | 4/2020 | Miyazaki |
| 2021/0216877 | A1* | 7/2021 | Jung ...................... G06N 3/088 |
| 2021/0372395 | A1* | 12/2021 | Li ............................ F04B 51/00 |
| 2022/0318624 | A1* | 10/2022 | Natsumeda .......... G06N 3/0455 |

FOREIGN PATENT DOCUMENTS

| | | | | |
|---|---|---|---|---|
| CN | 103323228 | A | | 9/2013 |
| CN | 103707025 | A | | 4/2014 |
| CN | 106272488 | A | | 1/2017 |
| CN | 207448354 | U | | 6/2018 |
| CN | 108237529 | A | | 7/2018 |
| CN | 108715403 | A | | 10/2018 |
| CN | 109408552 | A | | 3/2019 |
| CN | 110160789 | A | | 8/2019 |
| CN | 110533167 | A | * 12/2019 | ............ G06N 3/084 |
| CN | 110587575 | A | | 12/2019 |
| CN | 210100015 | U | | 2/2020 |
| CN | 111520318 | A | | 8/2020 |
| CN | 112507785 | A | | 3/2021 |
| CN | 112598111 | A | | 4/2021 |
| CN | 112814584 | A | | 5/2021 |
| CN | 112875316 | A | | 6/2021 |
| CN | 112922827 | A | | 6/2021 |
| CN | 213615173 | U | | 7/2021 |
| CN | 113256443 | A | | 8/2021 |
| CN | 113609932 | A | | 11/2021 |
| CN | 216398626 | U | | 4/2022 |
| JP | 2004034290 | A | | 2/2004 |
| JP | 2020059115 | A | | 4/2020 |
| KR | 102321607 | B1 | | 11/2021 |
| WO | 2019196754 | A1 | | 10/2019 |
| WO | 2020069224 | A1 | | 4/2020 |
| WO | 2021101433 | A4 | | 5/2021 |

OTHER PUBLICATIONS

International Preliminary Report on Patentability Chapter I for PCT Application No. PCT/CN2021/124413 mailed on Apr. 11, 2024.
International Preliminary Report on Patentability Chapter I for International Application No. PCT/CN2022/090145 mailed on Jun. 20, 2024.
Non-Final Office Action for U.S. Appl. No. 17/883,192 mailed on Mar. 14, 2023.
Written Opinion and International Search Report for PCT Application No. PCT/CN2021/124413 mailed on Jun. 30, 2022.
Written Opinion and International Search Report for PCT Application No. PCT/CN2022/090145 mailed on Aug. 5, 2022.
First Office Action for Chinese Application No. 202111507167.3 mailed on Feb. 5, 2025.
Rejection Decision for Chinese Application No. 202111507167.3 mailed on Apr. 24, 2025.
First Office Action for Chinese Application No. 202111134222.9 mailed on Dec. 18, 2024.
Second Office Action dated Nov. 19, 2025, issued in Chinese Patent Application No. 202111507167.3, with English machine translation (14 pages).
Supplementary Search dated Nov. 19, 2025, issued in Chinese Patent Application No. 202111507167.3 (1 page).

* cited by examiner

VALVE FAULT DETECTION METHOD AND APPARATUS

CROSS-REFERENCE TO RELATED APPLICATIONS

This application is a continuation application of International Patent Application No. PCT/CN2022/090145 filed Apr. 29, 2022, which claims priority to Chinese Patent Application No. 202111507167.3, filed with China National Intellectual Property Administration on Dec. 10, 2021. The content of all of the above-referenced applications is incorporated herein by reference in their entirety.

TECHNICAL FIELD

This application relates to the field of fault detection, and more particularly, to a valve fault detection method.

BACKGROUND

Reciprocating pumps such as plunger pumps are usually complex in structure, have relatively large sources that generate vibration signals, and are relatively difficult to detect faults and to maintain. A suction valve and a discharge valve in a pump device are usually components that need to be maintained most. A valve fault is considered as a main reason for causing unexpected shutdown of the pump device. Currently, some existing technical researches on valve fault detection relate to construction of an algorithm model through a pressure signal, a temperature signal, a vibration signal, and the like to perform fault detection. Because of factors such as a high pressure environment in a pump body, it is relatively difficult to mount a sensor inside a cylinder. A sensor outside the cylinder usually captures a vibration signal, and an algorithm model is created to perform fault detection. Therefore, accuracy could be higher for such models than those using data captured by a sensor inside a cylinder.

SUMMARY

Technical Problems to be Resolved

In the existing technical researches, a model for performing fault detection through a vibration signal mainly includes: setting a threshold based on a signal acquired by a vibration sensor to perform fault detection, performing fault detection with the aid of neural network structures such as naive Bayes classification, BP, a convolutional neural network (CNN), an autoencoder, and an Long Short-Term Memory (LSTM), and the like. The related researches are mostly based on laboratory environments, but are not applied to actual production operations. For construction of an algorithm model in the related researches, indicator systems are not considered comprehensively, and prediction methods are not diversified. As a result, problems such as low prediction precision exist.

In the foregoing existing technology for detecting a fault of a valve such as a plunger pump, the following problems exist:

1. In the detection method constructed based on a neural network structure, when a model is inputted and an indicator system is constructed, consideration is mostly not given simultaneously from two aspects including time-domain characteristics and frequency-domain characteristics, and the indicator system is not constructed comprehensively enough.

2. In most detections, time sequence fluctuation changes of characteristic indicators in a signal fault occurrence are not considered, and are not added to the signal characteristic indicator system.

3. The detection is generally based on a single neural network model, and consideration is not given to a combination of a plurality of network structures to improve prediction precision.

4. Many researches are based on laboratory environments, and there is a lack of device operation data of an on-site real environment. As a result, contribution factors are not considered comprehensively, and a model prediction result cannot be applied to an actual industrial production operation.

5. There is a lack of a valve replacement log related to an on-site operation of a real device and practical expert experience such as an experience summary of technical backbones and experts to assist in judgment.

To resolve the foregoing problems, this application provides a valve fault detection method. The method can establish a more complete and accurate signal characteristic indicator system, to improve prediction precision of a model, and the detection method can improve universality and accuracy of actual application of the model in consideration of signal characteristic time sequence fluctuation trend factors and in combination with two network structures such as an LSTM and an autoencoder.

Technical Solutions

To achieve the foregoing objectives, a valve fault detection method is provided. The method includes: constructing a valve fault indicator system reflecting characteristics of vibration signals of valve states; establishing an LSTM-AE model by using an LSTM deep model and according to an autoencoder principle, and setting a fault discrimination threshold; inputting training data into the LSTM-AE model based on the valve fault indicator system, to train the LSTM-AE model; and inputting detection data of a to-be-detected valve into the trained LSTM-AE model based on the valve fault indicator system, and comparing an output value obtained by the trained LSTM-AE model with the set fault discrimination threshold, to judge whether the detected valve is faulty and outputting a first judgment result indicating whether the first valve is faulty.

Further, the constructing a valve fault indicator system reflecting characteristics of vibration signals of valve states includes: constructing time-domain statistical indicators reflecting time-domain characteristics of the vibration signal based on the vibration signal; and constructing frequency-domain indicators reflecting frequency spectrum difference characteristics of the vibration signal.

Further, the constructing a valve fault indicator system reflecting characteristics of vibration signals of valve states further includes: performing sensitivity comparison on the time-domain statistical indicators to obtain valve fault sensitive statistical indicators; screening the frequency-domain indicators to select a frequency-domain characteristic indicator by calculating a frequency-domain energy sum and a frequency-domain energy sum ratio of the frequency-domain indicators of the vibration signals; and constructing the valve fault indicator system based on the valve fault sensitive statistical indicators and the selected frequency-domain characteristic indicator.

Further, the valve fault detection method further includes: constructing an expert experience library, and processing text data of the expert experience library into a structured text, where the expert experience library includes a valve structure routine maintenance log, a device maintenance specification, an after-sales maintenance record, and a technician experience summary for second valves; judging whether the valve is faulty based on the detection data of the to-be-detected valve and according to the expert experience library, and outputting a second judgment result; and obtaining, based on the first judgment result and the second judgment result, a final judgment result used for judging whether the valve is faulty.

Further, in some embodiments, the method further includes outputting the first judgment result or the second judgment result as the final judgment result if the first judgment result is the same as the second judgment result.

In some embodiments, the method further includes outputting the first judgment result as the final judgment result if the first judgment result indicates that the first valve is normal and the second judgment result indicates that the first valve is faulty.

In some embodiments, the method further includes in response to that the first judgment result indicates that the first valve is faulty and the second judgment result indicates that the first valve is normal, determining whether a fault alarm is detected continuously for a period of time and determining whether a fault occurrence trend exists by analyzing past detection data of the first valve, to judge whether the valve is faulty.

Further, in some embodiments, the method further includes in response to determining that the fault alarm is detected continuously for the period of time and determining that the fault occurrence trend exists, judging that the first valve is faulty as the final judgment result.

Further, the valve fault detection method further includes: acquiring data of the valve in a faulty state and in a normal state by using a vibration sensor mounted on the valve, to obtain the vibration signals.

Further, the valve fault sensitive statistical indicators include a kurtosis indicator, a root mean square value, a peak indicator, and a pulse indicator.

Further, the valve fault sensitive statistical indicators include a root mean square value, a peak indicator, a pulse indicator, and a skewness indicator.

Further, the setting a fault discrimination threshold includes: setting a threshold interval [err_train_min, err_train_max*1000], where err_train_min represents a minimum mean square error of the training data, and err_train_max represents a maximum mean square error of the training data; dividing the interval at equal intervals, extracting thresholds one by one based on the interval, and calculating values of evaluation indicators AUC and F1 of the LSTM-AE model when the thresholds are extracted; and determining a value or value range of the fault discrimination threshold according to the obtained evaluation indicators AUC and F1.

Further, the constructing time-domain statistical indicators reflecting time-domain characteristics of the vibration signal includes: constructing the time-domain statistical indicators by calculating indicators including a mean value, an absolute mean value, a variance, a standard deviation, a square root amplitude, a root mean square value, a peak, a maximum value, a minimum value, a waveform indicator, a peak indicator, a pulse indicator, a margin indicator, a skewness indicator, and a kurtosis indicator for the time-domain characteristics of the vibration signal.

Further, the constructing frequency-domain indicators reflecting frequency spectrum difference characteristics of the vibration signal based on the vibration signal includes: performing Ensemble Empirical Mode Decomposition (EEMD) on the vibration signal, to obtain a plurality of components; and performing fast Fourier transform (FFT) on the components, to obtain component frequency-domain signals.

Further, the calculating a frequency-domain energy sum and a frequency-domain energy sum ratio of the frequency-domain indicators of the vibration signals, and screening the frequency-domain indicators includes: calculating a frequency-domain energy sum and a frequency-domain energy sum ratio of the component frequency-domain signals; and ranking the component frequency-domain signals according to the frequency-domain energy sum ratio, and using a frequency-domain energy sum of component frequency-domain signals ranked top 80% as the frequency-domain characteristic indicator.

According to another aspect of this application, a computer device is provided, the computer device including a memory and a processor, where the memory stores a computer program executable on the processor, and the processor, when executing the computer program, implements steps of the foregoing valve fault detection method.

According to still another aspect of this application, a non-transitory computer-readable storage medium is provided. The non-transitory computer-readable storage medium stores a computer program, where when the computer program is executed, steps of the foregoing valve fault detection method are implemented.

Beneficial Effects

In the valve fault detection method of this application, signal characteristic extraction is considered from two aspects including a time-domain and a frequency-domain, and steps such as performing signal decomposition on frequency-domain characteristics and maximizing faulty characteristics can establish a more complete and accurate signal characteristic indicator system, to improve prediction precision of the detection model.

In addition, the valve fault detection method of this application improves universality and accuracy of actual application of the model in consideration of signal characteristic time sequence fluctuation trend factors and in combination with two network structures such as an LSTM and an autoencoder.

In addition, the valve fault detection method of this application accumulates rich knowledge for device maintenance, later device upgrading and reconstruction, and the like by performing structured processing on existing historical operation logs, experience summaries, and the like of technicians or experts, and generating an expert experience library through induction.

In addition, in the valve fault detection method of this application, through a dual-track check detection model based on an LSTM-AE model and an expert experience library, valve fault prediction accuracy is higher, a misjudgment risk is smaller, and an actual applicability is stronger.

BRIEF DESCRIPTION OF THE DRAWINGS

The accompanying drawings that constitute a part of this application are used to provide a further understanding of this application. Exemplary embodiments of this application and descriptions of the embodiments are used to explain this application, and do not constitute any inappropriate limitation to this application. In the accompanying drawings.

DETAILED DESCRIPTION

To make the objectives, technical solutions, and advantages of this application clearer and more understandable, this application is further described in detail below with reference to accompanying drawings and embodiments. It should be understood that the specific embodiments described herein are only used for explaining this application, and are not used for limiting this application.

Figure 1:
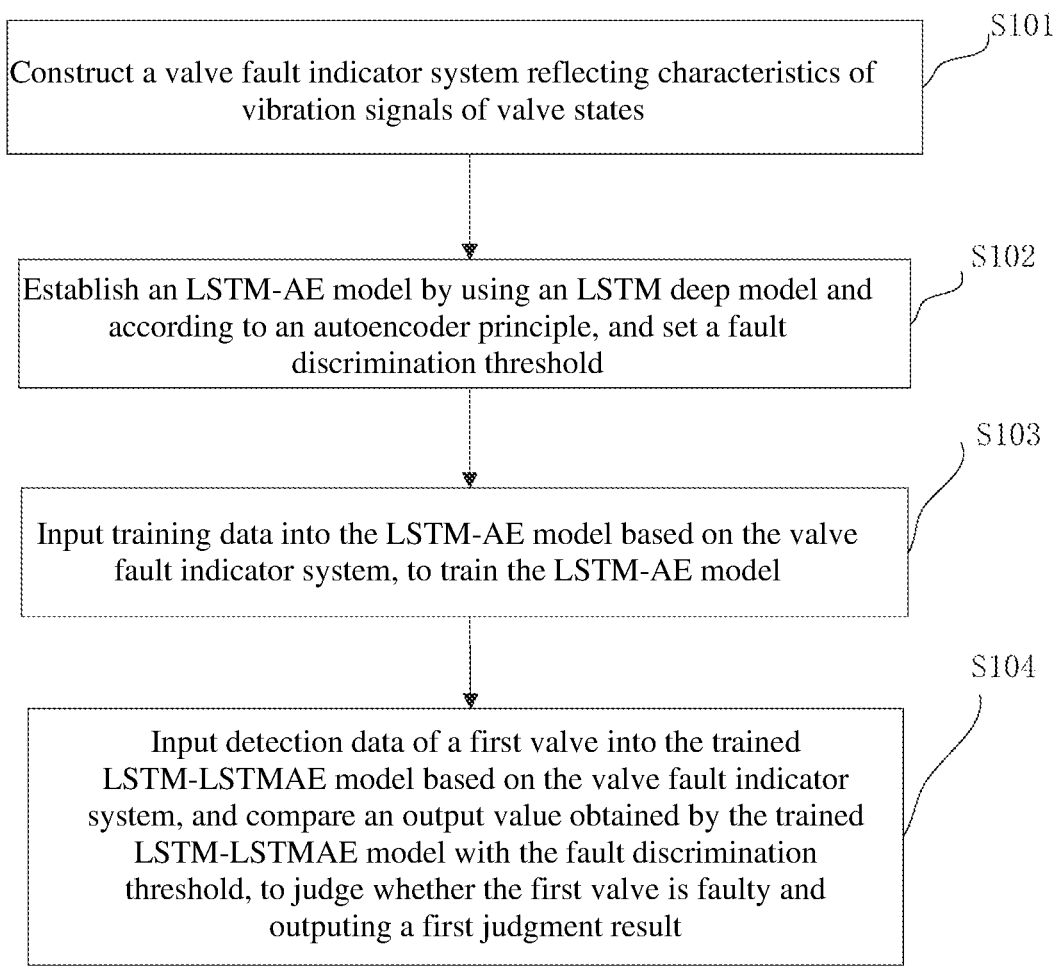
FIG. 1 is a flowchart of a valve fault detection method, according to an embodiment of this application.

As shown in FIG. 1, according to an exemplary embodiment of this application, a valve fault detection method is provided. The method includes: (S101) constructing a valve fault indicator system reflecting characteristics of a vibration signal of a valve state; (S102) establishing an LSTM-AE model by using an LSTM deep model and according to an autoencoder principle, and setting a fault discrimination threshold; (S103) inputting training data into the LSTM-AE model based on the valve fault indicator system, to train the LSTM-AE model; and (S104) inputting detection data of a to-be-detected valve into the trained LSTM-AE model based on the valve fault indicator system, and comparing an output value obtained by the LSTM-AE model with the set fault discrimination threshold, to judge whether the detected valve is faulty and output a first judgment result.

In addition, the valve fault detection method according to this application improves universality and accuracy of application of the model by combining such two networks as an LSTM and an autoencoder.

A method for constructing a valve fault indicator system, a method for constructing an LSTM-AE model, and a method for detecting a valve fault by using an LSTM-AE model according to this application are described in detail below.

According to an exemplary embodiment of this application, a vibration sensor is mounted on a valve (for example, a valve of a plunger pump), and data of a vibration signal of the valve in a faulty state and a normal state is acquired with the aid of a signal acquisition instrument to serve as the original data, including e.g., a vibration amplitude.

How to acquire a vibration signal through the vibration sensor is described below by using a five-cylinder plunger pump as an example.

According to an exemplary embodiment of this application, unidirectional acceleration vibration sensors are used, an acquisition frequency is set to 10 kHz, and one vibration sensor is mounted on each of upper valves and lower valves of five cylinder bodies at a hydraulic end of the plunger pump to acquire vibration data of the valves. 10 unidirectional acceleration vibration sensors are respectively mounted on 10 unidirectional valves at the hydraulic end, and specific mounting positions are shown in Table 1.

TABLE 1

| Mounting position | Direction |
| --- | --- |
| Inner side of a discharge cap of cylinder 1 at the hydraulic end | Plunger direction |
| Inner side of a discharge cap of cylinder 2 at the hydraulic end | Plunger direction |
| Inner side of a discharge cap of cylinder 3 at the hydraulic end | Plunger direction |
| Inner side of a discharge cap of cylinder 4 at the hydraulic end | Plunger direction |
| Inner side of a discharge cap of cylinder 5 at the hydraulic end | Plunger direction |
| Inner side of cylinder 1 of a suction manifold | Vertical direction |
| Inner side of cylinder 2 of a suction manifold | Vertical direction |
| Inner side of cylinder 3 of a suction manifold | Vertical direction |
| Inner side of cylinder 4 of a suction manifold | Vertical direction |
| Inner side of cylinder 5 of a suction manifold | Vertical direction |

Certainly, other vibration sensors different from the foregoing unidirectional acceleration vibration sensors may alternatively be used, to acquire vibration signals with the required frequency.

Through the foregoing setting, data sufficient to truly reflect a valve state can be obtained. Therefore, the LSTM-AE model can be better trained with the data.

According to an exemplary embodiment of this application, the foregoing obtained vibration signals are preprocessed, thereby obtaining time-domain statistical indicators reflecting time-domain characteristics of vibration signal data.

According to an exemplary embodiment of this application, the time-domain statistical indicators are constructed by calculating 15 indicators including, but not limited to, a mean value, an absolute mean value, a variance, a standard deviation, a square root amplitude, a root mean square value, a peak, a maximum value, a minimum value, a waveform indicator, a peak indicator, a pulse indicator, a margin indicator, a skewness indicator, and a kurtosis indicator for the time-domain characteristics of the vibration signal, and data normalization calculation is performed on these time-domain statistical indicators. The data normalization standard performs a MIN-MAX standardization method.

In addition, according to an exemplary embodiment of this application, EEMD (Ensemble Empirical Mode Decomposition) is performed on the acquired vibration signal, that is, a white noise is added to an original frequency spectrum signal x(t), original signal distribution is uniformly adjusted, and then EMD (Empirical Mode Decomposition) is performed, to generate n components imf, that is, $x(t)=\{imf_1(t), imf_2(t), \ldots, imf_n(t)\}$. In addition, FFT (fast Fourier transform) transform is performed on the components, to obtain component frequency-domain signals $\{imf_1'(t), imf_2'(t), \ldots, imf_n'(t)\}$.

Therefore, frequency-domain indicators reflecting frequency spectrum difference characteristics of the vibration signal are constructed based on the vibration signals.

In some embodiments, sensitivity comparison is performed on the foregoing time-domain statistical indicators to obtain valve fault sensitive statistical indicators.

Specifically, sensitivity comparison is performed for data of the foregoing 15 time-domain statistical indicators, that is, the acquired vibration signal data is segmented with a time window of a given length, values of the time-domain statistical indicators in each segment of time window are calculated, then time sequence fluctuation sensitivities of the same time-domain statistical indicator of the valve in the normal state and the faulty state under the same coordinate system are compared, a time-domain statistical indicator having an evidently different boundary and value domain space is reserved as a valve fault sensitive statistical indicator, and other statistical indicators are not considered as valve fault sensitive statistical indicators of the model.

A time sequence fluctuation sensitivity diagram of each of the foregoing 15 time-domain statistical indicators in of the valve in the normal state and the faulty state under the same coordinate system is drawn according to the foregoing method.

Figure 2:
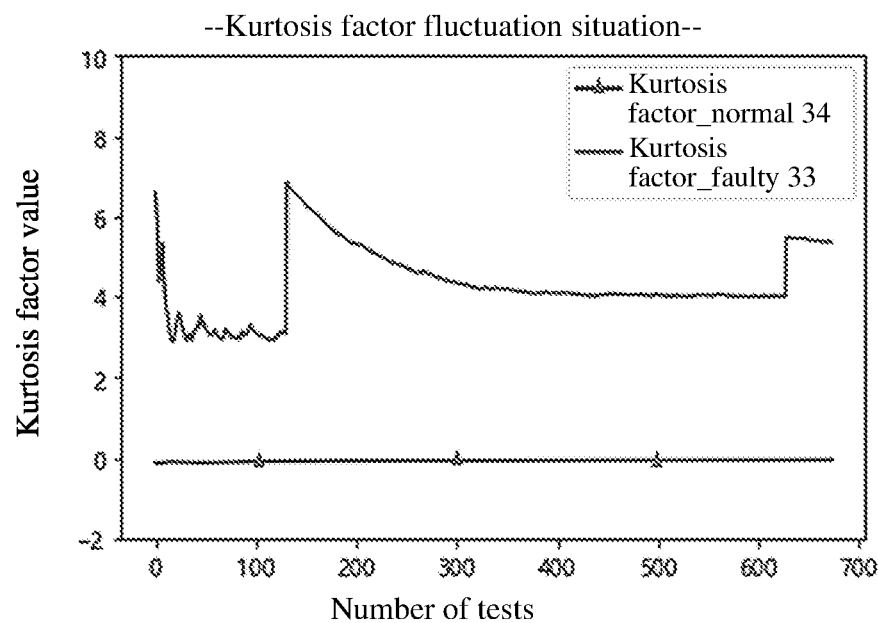
FIG. 2 is a test diagram of a comparison between kurtosis factor fluctuation situations when time-domain statistical indicators are screened through a sensitivity comparison, according to an embodiment of this application.
Figure 3:
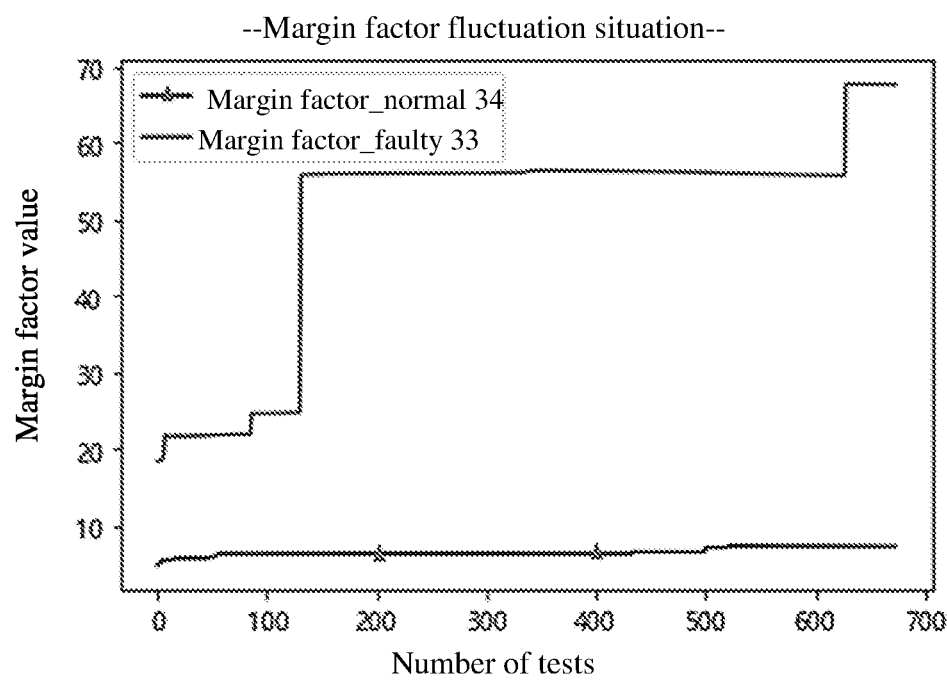
FIG. 3 is a test diagram of a comparison between margin factor fluctuation situations when time-domain statistical indicators are screened through a sensitivity comparison, according to an embodiment of this application.

A kurtosis factor and a margin factor are used as an example, and FIG. 2 and FIG. 3 respectively show time sequence fluctuation sensitivity diagrams of a kurtosis factor and a margin factor of the valve in the normal state and the faulty state under the same coordinate system. It can be seen from the diagrams that, an x axis indicates a quantity of continuous tests. For example, vibration signal data in a time length of 10 seconds is sequentially captured in a time order in each test to calculate the foregoing kurtosis factor and margin factor, values of which are used as values of a y axis. As shown in the diagrams, diagrams of differences and comparisons between fluctuation trends and magnitudes of the kurtosis factor and the margin factor in such two states as faulty device and normal device in time-domain are constructed.

As shown in FIG. 2 and FIG. 3, entire value domain magnitudes of the margin indicator and the kurtosis indicator in the faulty state are far higher than those in the normal state, and the two have an evident division line. Therefore, the margin indicator and/or the kurtosis indicator may be selected as valve fault sensitive statistical indicators.

By performing fault sensitivity comparison through the foregoing method, time-domain statistical indicators relatively sensitive to a valve fault are obtained as valve fault sensitive statistical indicators. In some embodiments, the valve fault sensitive statistical indicators may include a kurtosis indicator $\overline{T}_1$, a root mean square value $\overline{T}_2$, a peak indicator $\overline{T}_3$, and a pulse indicator $\overline{T}_4$. Alternatively, the valve fault sensitive statistical indicators may include a root mean square value $\overline{T}_1$, a peak indicator $\overline{T}_2$, a pulse indicator $\overline{T}_3$, and a skewness indicator $\overline{T}_4$. It should be understood that, by reading this specification, a person skilled in the art may evidently select any appropriate indicator data combination from the data of the foregoing 15 time-domain statistical indicators as a valve fault sensitive statistical indicator as required.

According to an exemplary embodiment of this application, a frequency-domain energy sum and a frequency-domain energy sum ratio of the foregoing obtained component frequency-domain signals $\{imf_1'(t), imf_2'(t), \ldots, imf_n'(t)\}$ are calculated, and a calculation formula is as follows:

$$E_j = \sum_{i=1}^{n} |imf_{ji}'|^2,$$

$$E_j' = \frac{E_j}{E_{all}}$$

where $|imf_{ji}'|$ represents a modulus of an amplitude corresponding to each discrete frequency of a $j^{th}$ imf component, $E_j$ represents an energy sum of the $j^{th}$ imf component, $E_{all}$ is a total energy sum of an original vibration signal subjected to FFT transform, and $E_j'$ represents a ratio of the energy sum of the $j^{th}$ component energy to the total energy sum of the original vibration signal.

Then, according to the frequency-domain energy sum ratio, the imf components are ranked in descending order of energy sum ratios, imf components whose frequency-domain energy sum is ranked, for example, bottom 20% are removed, and a frequency-domain energy sum of remaining imf components is used as the original signal frequency-domain characteristic indicator, $(E_1, E_2, \ldots, E_k)$, that is, a frequency-domain energy sum of imf component frequency-domain signals ranked top 80% is used as the original signal frequency-domain characteristic indicator, where k is a quantity of the reserved imf components. In addition, normalization processing is performed on frequency-domain energy sum values of imf component frequency-domain signals.

As described above, a frequency-domain energy sum and a frequency-domain energy sum ratio of the frequency-domain indicators of the vibration signal are calculated, and the foregoing frequency-domain indicators are screened to select a frequency-domain characteristic indicator.

The valve fault indicator system $\{T_1, T_2, T_3, T_4, E_1, E_2, \ldots, E_k\}$ is constructed based on the valve fault sensitive statistical indicators obtained through the foregoing method and the selected frequency-domain characteristic indicator.

Establishing an LSTM-AE model by using an LSTM deep model and according to an autoencoder principle is described according to an exemplary embodiment of this application below.

The LSTM-AE model structure according to this application includes two parts, that is, an encoder and a decoder. Both the encoder and the decoder are network structures generated by training based on sample data and performing model tuning. According to an exemplary embodiment of this application, each of the encoder and the decoder includes two LSTM recurrent network layers and one fully connected layer network.

In some embodiments, in the encoder, the LSTM layer includes 15 to 60 neurons, and the fully connected layer includes 10 to 20 neurons.

In some embodiments, in the decoder, the LSTM layer includes 15 to 60 neurons, and the fully connected layer includes (quantity of input sample characteristics*feedforward time step) neurons.

A specific quantity of neurons of each layer may be iteratively tuned and selected within the foregoing ranges of quantities of neurons according to sample data prediction accuracy. Additionally, in each LSTM layer, neurons are randomly selected by setting dropout>0, to prevent overfitting of model training.

In addition, in some embodiments, a mean square error function is used as an LSTM-AE model loss function to calculate an error between input data and a prediction result.

Further, a valve fault discrimination threshold is set for the LSTM-AE model to perform valve fault anomaly recognition.

Thresholds are dynamically screened according to values of model performance evaluation indicators (such as an AUC value and an F1 value). A threshold interval [err_train_min, err_train_max*1000] is set first, where err_train_min represents a minimum mean square error of the training data, and err_train_max represents a maximum mean square error of the training data. The training data is data obtained based on the foregoing valve fault indicator system.

An upper limit of the foregoing interval may be any number greater than the maximum mean square error, and a lower limit may be any number less than the minimum mean square error. However, in consideration of validity of the interval and according to an experimental conclusion, a value may be selected from the interval between the maximum mean square error of the training data multiplied by 1000 and the minimum mean square error of the training data, and the upper limit and the lower limit may be adjusted within a small range.

Then, the interval is divided at equal intervals into a plurality of portions such as 1000 portions, and threshold assignment tests are performed one by one based on the interval. Model prediction result evaluation indicators, namely, an AUC value and an F1 value during value assignment are calculated, and properness of a value or value range of the valve fault discrimination threshold (if both the AUC value and the F1 value in a segment of interval continuously approach to 1, an average value of the interval is taken as the threshold) is determined according to the two evaluation indicator values.

Figure 4:
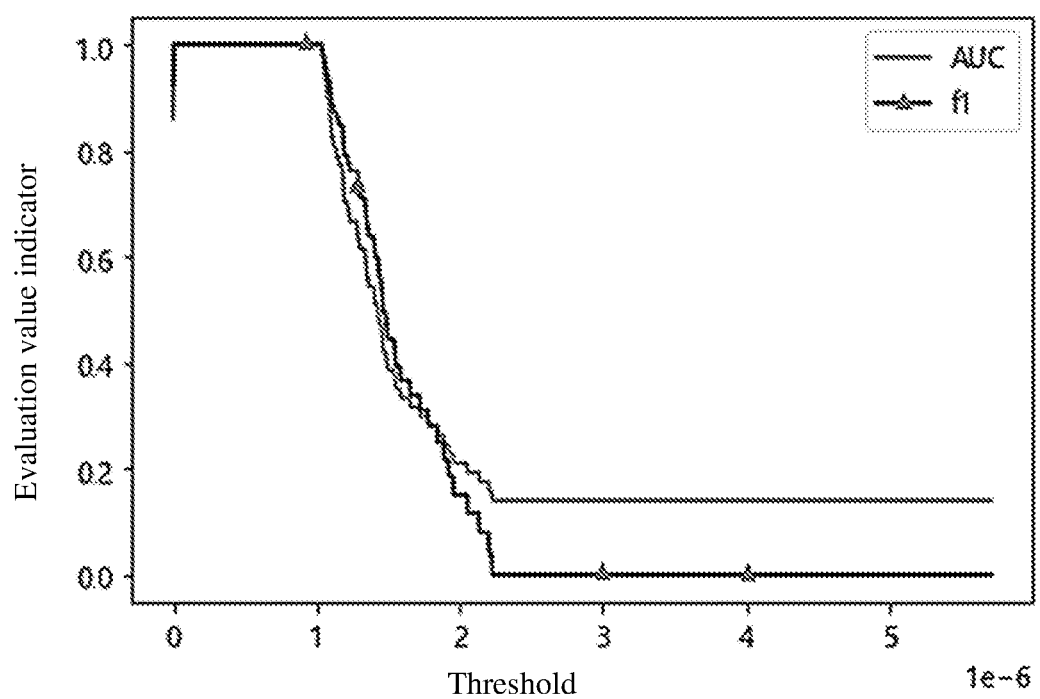
FIG. 4 is a diagram of experimental fluctuation curves of AUC and F1 values in a fault discrimination threshold setting process in an AE (autoencoder) algorithm, according to an embodiment of this application.

FIG. 4 is a diagram of experimental fluctuation curves of AUC and F1 values in a fault discrimination threshold setting process in an AE (autoencoder) algorithm, according to an embodiment of this application. As shown in the diagram, a horizontal coordinate represents a valve fault discrimination threshold, and a vertical coordinate represents an evaluation indicator value. As shown in the diagram, when an AUC value and F1 approach to 1, an average value of the interval may be taken as the valve fault discrimination threshold.

Therefore, according to this application, by setting a threshold interval [err_train_min, err_train_max*1000], dividing the interval at equal intervals, and extracting thresholds one by one based on the interval, evaluation indicators, namely, an AUC value and an F1 value of the LSTM-AE model during threshold extraction may be calculated, thereby determining a proper value or value range of the fault discrimination threshold according to the obtained evaluation indicators AUC and F1.

Therefore, the obtained value or value range of the fault discrimination threshold is used to judge whether the valve is abnormal. When a test value is greater than the fault discrimination threshold of the valve, it is judged that the valve is faulty. When a test value is less than the fault discrimination threshold of the valve, it is judged that the valve is normal.

Figure 5:
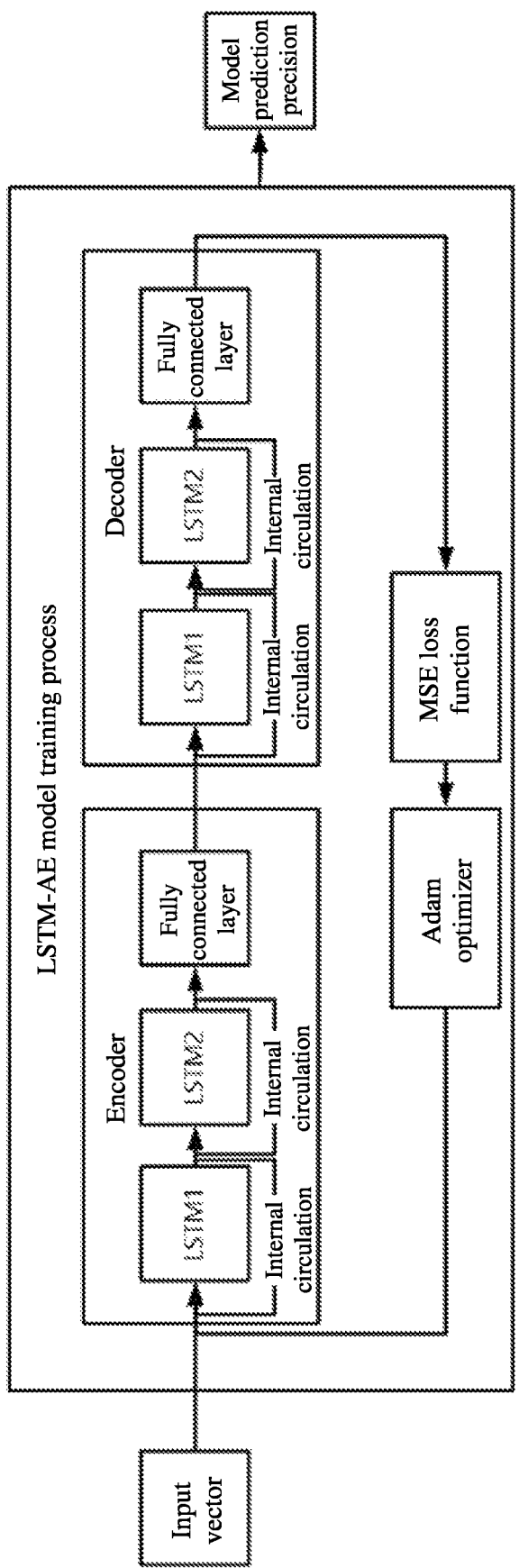
FIG. 5 schematically shows an internal structure and a training process of an LSTM-AE model, according to an embodiment of this application.

FIG. 5 shows an internal structure and a training process of an LSTM-AE model, according to an embodiment of this application.

Related parameters involved in model training are shown in the following Table 2.

TABLE 2

| | |
|---|---|
| Epoch (quantity of model training times) | 100 |
| Learning rate | 0.001 |
| Quantity of reserved threshold imf components | K = 7 |
| Fault discrimination threshold of valve | 5.748423185997148e−07 |

As shown in the diagram, model training data is inputted into the model each time with the quantity of Epoch.

For example, model training data is operation data of a fracturing pump in a well field of the province, a device is a 5000-type electric-powered fracturing skid, a rotational speed at a power end of the fracturing pump is 1900 rpm, there are a total of 5 cylinders at a hydraulic end, and there are a total of 10 upper and lower valve assemblies. Experimental data is derived from vibration signal acquisition performed on an upper valve assembly close to a high-pressure discharge end of cylinder 1 (a corresponding vibration sensor is in a 'direction of a plunger on an inner side of a discharge cap of cylinder 1 at a hydraulic end'), and an acquisition frequency is 10 kHz. Normal operation data of the device at different well segments in the same well field accumulated in 60 hours, and faulty operation data of the device at the different well segments in the same well field accumulated in two hours are acquired.

Vibration signal data of a length of 600000 points (that is, 1 minute) is sequentially captured in a time order. According to the foregoing model valve fault indicator system, indicator values of the valve fault indicator system are calculated, and a total of 3600 rows of normal characteristic indicator data and 120 rows of faulty characteristic indicator data are obtained, where both the normal characteristic indicator data and the faulty characteristic indicator data are data based on the foregoing model valve fault indicator system. In addition, forward sliding sampling is performed with, for example, a time window of 3 minutes, to create a three-dimensional array having time-domain trend fluctuation characteristics, that is, (1, batch_size, (k+4)*3), where batch_size represents a sample length of the three-dimensional array, and k is a quantity of reserved imf components.

For example, 99% of the foregoing obtained normal characteristic indicator data may be used as training data to train the LSTM-AE model.

The foregoing training data is inputted, the training data is calculated through each layer of neurons of the encoder, and a result is outputted to the decoder to calculate each layer of neurons and output a calculation result with the same structure as that of the training data.

Loss values of the outputted calculation result and the inputted training data are calculated through a mean square error loss function, gradient information is back propagated, and parameters of each layer of network are updated through Adam (Adaptive Moment Estimation).

In addition, the foregoing training process is repeated, and all Epoch training is performed on the model, until the loss value does not tend to decrease; and an AUC value after each time of Epoch is calculated. When the AUC value approaches to 1 and does not tend to increase, training may be completed, that is, the trained LSTM-AE model may be obtained.

Figure 6:
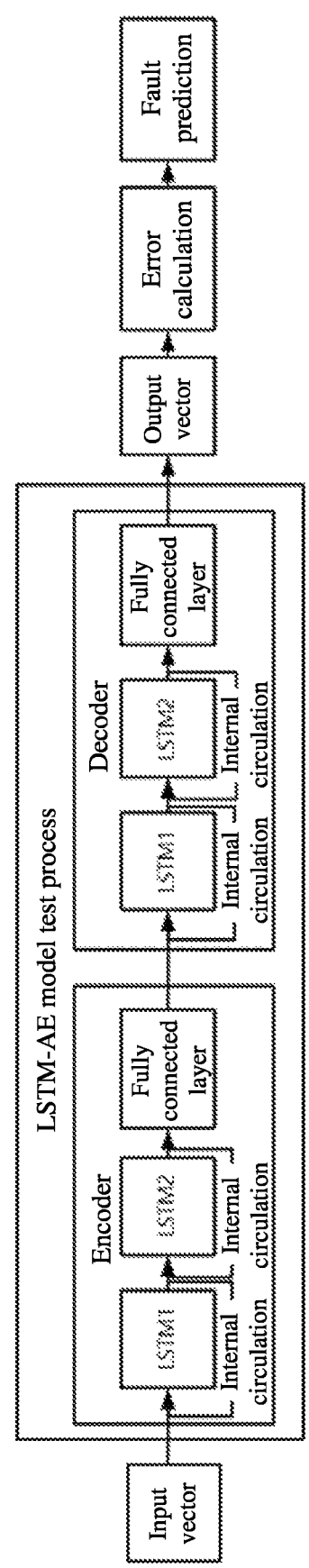
FIG. 6 schematically shows an internal structure and a testing process of an LSTM-AE model, according to an embodiment of this application.

FIG. 6 schematically shows a testing process of an LSTM-AE model, according to an embodiment of this application.

Test data based on the foregoing model valve fault indicator system is inputted into the model, where 1% of the foregoing normal characteristic indicator data and faulty characteristic indicator data obtained by an operation of a fracturing pump of a well field in the province may be used as the test data, where positive and negative sample labeling is performed on the foregoing experimental data, the faulty characteristic indicator data is labeled with 1, and the normal characteristic indicator data is labeled with 0.

The test data is calculated through each layer of neurons of the encoder, and a result is outputted to the decoder to calculate each layer of neurons and output a calculation result with the same structure as that of the training data.

A mean square error of the test data is calculated through a mean square error loss function, a device state is judged according to a valve fault discrimination threshold, and the test process ends.

Mean square error calculation results of the test data are shown in the following Table 3:

TABLE 3

| 1.3656744e−10 | 6.0024617e−11 | 6.6082535e−11 | 4.9380777e−11 |
| 4.9380777e−11 | 1.4042054e−10 | 6.2024413e−11 | 1.1417222e−10 |
| ... | ... | ... | ... |
| 1.5851367e−06 | 1.4575928e−06 | 1.4876275e−06 | 1.4053102e−06 |
| 1.2826864e−06 | 1.3016524e−06 | 1.4301578e−06 | 2.2050192e−06 |
| ... | ... | ... | ... |

It can be seen from the foregoing table that, in a first half part of a test data set, a normal operation data prediction mean square error of the device is on the order of magnitude of about e-10, and in a second half part, a faulty operation data prediction mean square error is on the order of magnitude of about e-06. Test results are shown in the following Table 4:

TABLE 4

| Data type | Test set data | Prediction result |
|---|---|---|
| Normal operation data of the device | 36 groups | 31 groups |
| Fault operation data of the device | 118 groups | 123 groups |

It can be seen from the foregoing table that, when anomaly recognition is performed on the test data, five groups of data are judged erroneously, and accounts for 3.2% of a total number of groups, and recognition accuracy of the LSTM-AE model is relatively high.

It can be known through the foregoing description that, in this application, signal characteristic extraction is considered from such two aspects as a time-domain and a frequency-domain, and steps such as performing signal decomposition on frequency-domain characteristics and maximizing faulty characteristics can establish a more complete and accurate signal characteristic indicator system, to improve prediction precision of the model.

In addition, this application improves universality and accuracy of actual application of the model in consideration of signal characteristic time sequence fluctuation trend factors and in combination with such two network structures as an LSTM and an autoencoder.

Figure 8:
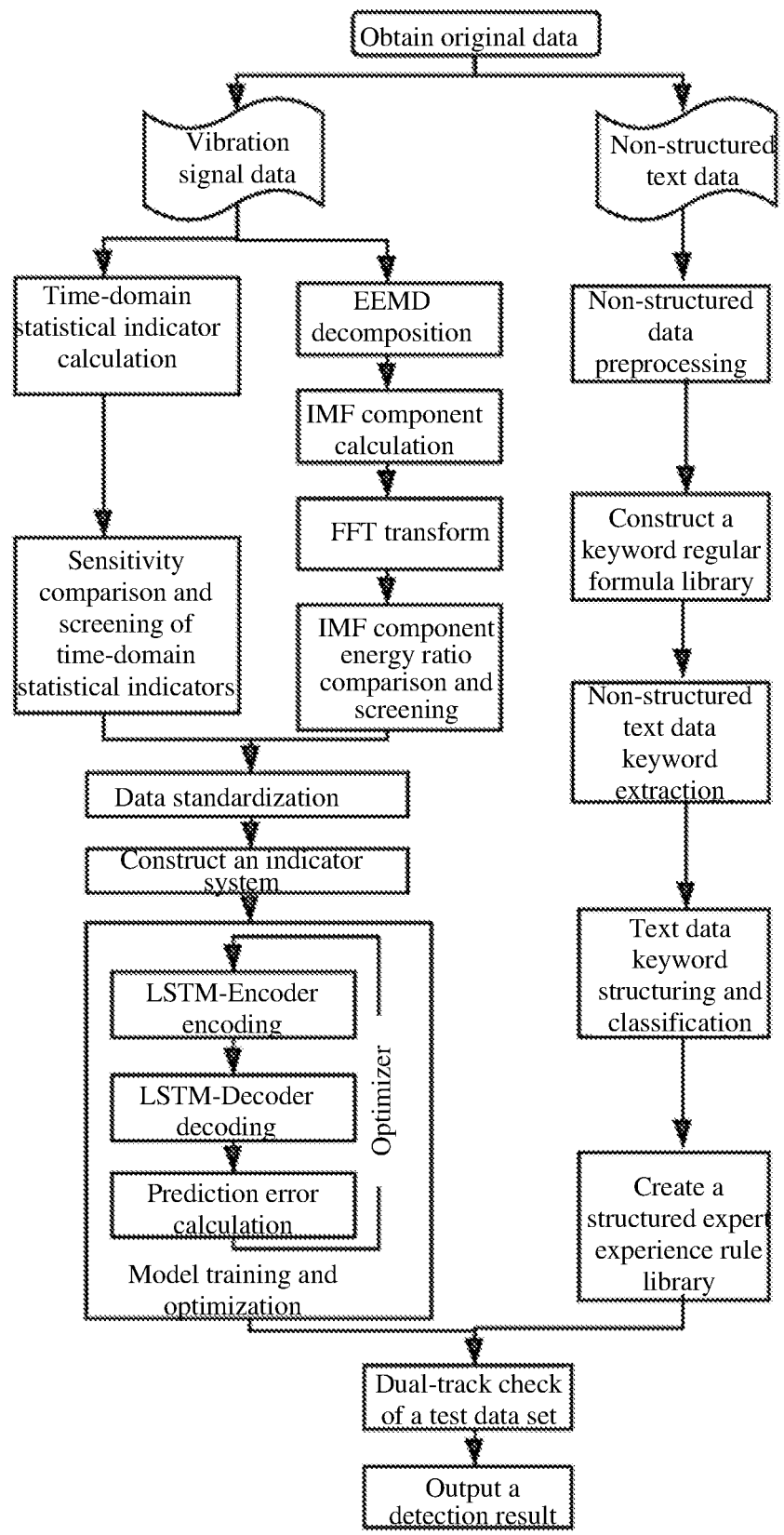
FIG. 8 is a flowchart of a valve fault detection method in combination with an LSTM-AE model and an expert experience library according to another embodiment of this application.

According to another exemplary embodiment of this application, as shown in FIG. 8, a left part shows the foregoing valve fault detection process based on an LSTM-AE, and a right part shows a process combined with an expert experience library, where anomaly recognition is performed on a valve of a device by combining an LSTM-AE model with personal operation experience of technical backbones and field experts in the industry, and expert experience libraries such as a large quantity of device technology specifications accumulated in many years, and device operation logs, to further improve prediction accuracy.

According to this application, keyword mining and structured processing are performed on non-structured text data such as personal operation experience of technical backbones and field experts, a large quantity of device technology specifications accumulated in many years, routine maintenance logs of valve structures of a valve device, device maintenance specifications, after-sales maintenance records, technician experience summary logs, and device operation logs, to generate a structured expert experience library.

Routine maintenance logs of a valve at a hydraulic end of a plunger pump in a well field are used as an example to describe processing non-structured text data into normative structured text data.

The following Table 5 shows routine maintenance logs of a valve at a hydraulic end of a plunger pump in a well field that are non-structured texts, and a specific format is as follows:

TABLE 5

| Number of plunger pump device | Device maintenance Assembly number | Initial on-pump time | Replacement time | Replacement record |
|---|---|---|---|---|
| JL00** | 06 (valve assembly at hydraulic end) | 2021 Jul. 30 10:14:00 | 2021 Aug. 2 12:32:00 | Valve body on-pump operation lasts for a total of 26 hours, and a total of ten rubber sheets of upper and lower valve bodies are damaged and renewed |
| EA50** | 06 (valve assembly at hydraulic end) | 2021 Aug. 4 09:02:00 | 2021 Aug. 5 21:08:00 | Valve bodies work for a total of 34 h, all valve assemblies are replaced with new ones this time, rubber sheets are damaged, and the valve bodies are broken |
| ... | ... | ... | ... | ... |

Figure 7:
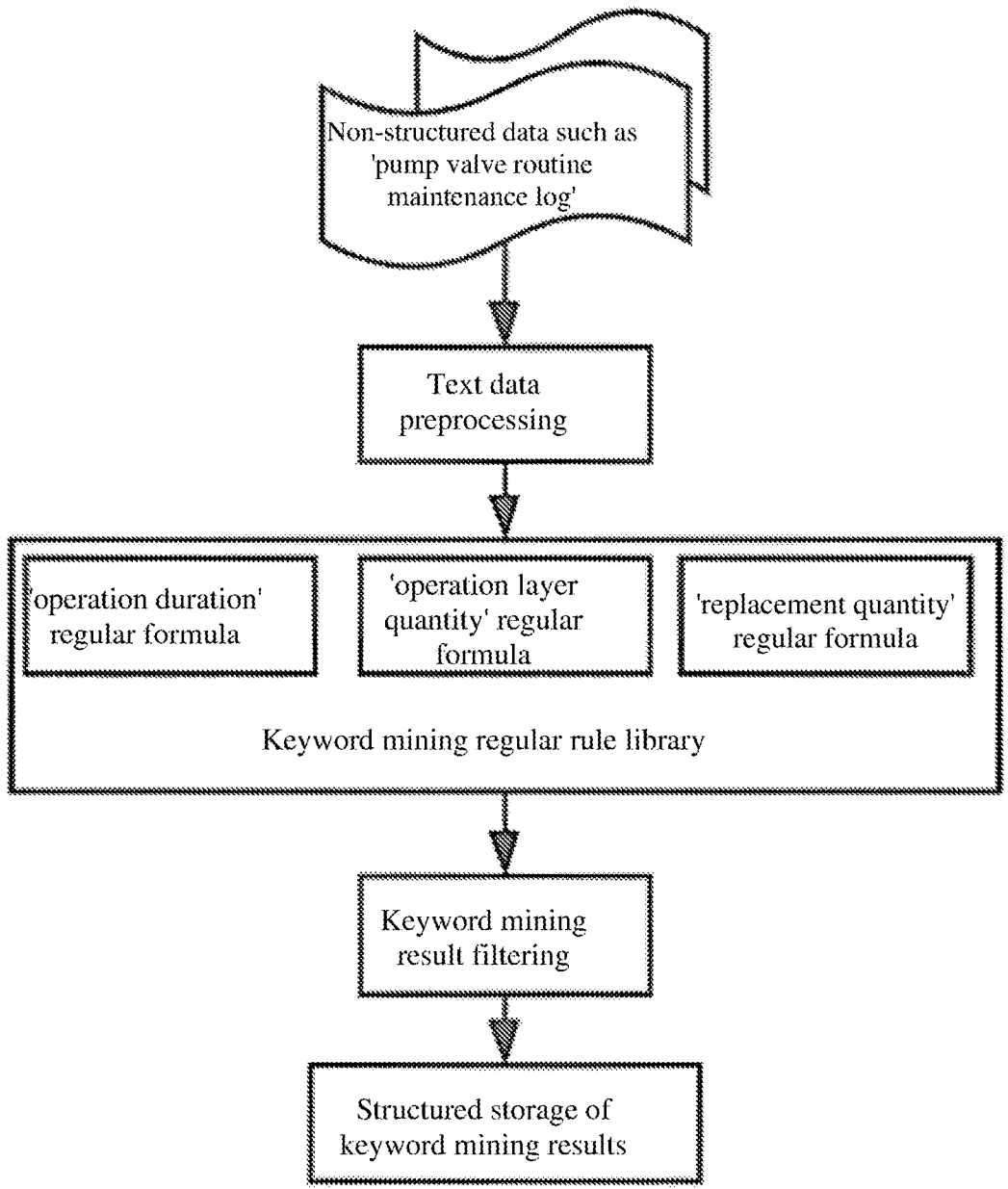
FIG. 7 schematically shows a regular formula library constructing process and a keyword mining process, according to an embodiment of this application.

For the foregoing 'replacement record' text, by constructing keyword mining regular formula libraries such as an 'operation duration regular formula', an 'operation layer quantity regular formula', and a 'replacement quantity regular formula', with the aid of python programming, keyword text mining, extracting, and filtering are performed on the source text, and structured storage is performed on extracted keywords, as shown in FIG. 7. Mining results are shown in the following Table 6:

TABLE 6

| Number of plunger pump pump device | Initial on-pump time | Replace-ment time | Working duration/ h | Replace-ment reason | Replace-ment quantity |
|---|---|---|---|---|---|
| JL00* | 2021 Jul. 30 10:14:00 | 2021 Aug. 2 12:32:00 | 26 | rubber sheets are damaged | Ten |
| EA50** | 2021 Aug. 4 09:02:00 | 2021 Aug. 5 21:08:00 | 34 | rubber sheets are damaged, and valve bodies are broken | All is replaced |
| ... | ... | ... | ... | ... | ... |

A valve fault detection rule expert experience library is created based on the foregoing keyword mining content, thereby obtaining a normalized expert experience rule, a specific format of which is, for example, shown in the following Table 7:

TABLE 7

| Rule number | Creation time | Rule state | Last update time | Rule content |
|---|---|---|---|---|
| Exp_FUN001 | 2021 Jul. 30 10:14:00 | Valid | None | Time(valves) <= 42 |
| Exp_FUN002 | 2021 Aug. 4 09:02:00 | Valid | None | 7 <= Plies(valves) <= 12 |
| ... | ... | ... | ... | ... |

Rules in Table 7 are constructed according to fields in Table 6. Specifically, based on fields such as 'working duration' and 'replacement reason' in Table 6, rules in Table 7 are self-defined and constructed according to expert experience.

As described above, construction of a normalized expert experience library is completed. This application accumulates rich knowledge for device maintenance and later device upgrading and reconstruction by performing structured processing on existing historical operation logs, experience summaries, and the like of technicians or experts, and generating an expert experience library through induction.

FIG. 8 is a flowchart of a method for performing valve fault detection in combination with an LSTM-AE model according to this application and an expert experience library according to another embodiment of this application, where a left part shows the foregoing process of constructing a valve fault indicator system and constructing an LSTM-AE model, and a right part shows a processes of constructing an expert experience library.

For ease of better understanding exemplary embodiments of this application, the foregoing obtained operation data of a fracturing pump of a well field in one province is used as an example to describe a valve fault detection process shown in FIG. 8. Construction of a valve fault indicator system, construction of an LSTM-AE model, and construction of an expert experience library are described in detail in the foregoing description, and details are not described herein again.

As described above, time-domain characteristics of operation data of a fracturing pump of a well field in the province obtained as original data, that is, vibration signal data are calculated, to obtain time-domain statistical indicators reflecting the time-domain characteristics of the vibration signal data, and sensitivity comparison is performed on the obtained time-domain statistical indicators, thereby selecting valve fault sensitive statistical indicators.

In addition, EEMD is performed on the vibration signal data to calculate IMF components, and FFT transform is performed on the IMF components, thereby obtaining component frequency-domain signals; and a frequency-domain energy sum and a frequency-domain energy sum ratio of the frequency-domain indicators of the vibration signal are calculated, and the frequency-domain indicators are screened to select a frequency-domain characteristic indicator.

Data standardization such as normalization processing is performed on the valve fault sensitive statistical indicators and the frequency-domain characteristic indicator, thereby constructing a valve fault indicator system: $\{T_1, T_2, T_3, T_4, E_1, E_2, \ldots, E_k\}$.

Normal characteristic indicator data based on the valve fault indicator system is obtained from the operation data of a fracturing pump of a well field in the province. For example, 99% of the obtained normal characteristic indicator data is used as training data, the training data is inputted into the foregoing constructed LSTM-AE model, and the LSTM-AE model is trained and optimized through an encoder, a decoder, a prediction error calculation module, an optimizer module, and the like, thereby finally obtaining a trained model.

As described above, non-structured text data including personal operation experience of technical backbones and field experts, a large quantity of device technology specifications accumulated in many years, routine maintenance logs of valve structures of a valve device, device maintenance specifications, after-sales maintenance records, technician experience summary logs, device operation logs, and the like is preprocessed. As described above, the keyword regular formula library is constructed, to extract keywords of the non-structured text data, and the non-structured text data is transformed into structured texts to be stored and classified, thereby creating a structured expert experience rule library.

1% of normal characteristic indicator data (36 groups in Table 4) and faulty characteristic indicator data (118 groups in Table 4) obtained by the foregoing operation of a fracturing pump of a well field in the province is used as test data and inputted to a trained LSTM-AE model. It can be known based on the foregoing test results (see prediction results of Table 4) from the LSTM-AE model that, five groups of data are judged erroneously.

Further, for the foregoing five groups of false negative experimental data, the constructed expert experience library is used. Whether the valve is faulty is judged based on detection data of a to-be-detected valve (that is, the foregoing five groups of false negative experimental data) and according to the expert experience library, and a judgment result is outputted. Specifically, related field rule matching is performed between related field data in a fault indicator system for five groups of prediction error data and all rules of the expert experience library, and for a rule matching result of the expert experience library, judgment is performed.

In addition, from a judgment result (that is, a first judgment result) based on the LSTM-AE model and a judgment result (that is, a second judgment result) based on the expert experience library, a final judgment result used for judging whether the valve is faulty is obtained:

If the judgment result based on the LSTM-AE model is the same as the judgment result based on the expert experience library, the judgment result based on the LSTM-AE model or the judgment result based on the expert experience library is used as the final judgment result;

- if the judgment result based on the LSTM-AE model indicates that the valve is normal and the judgment result based on the expert experience library indicates that the valve is faulty, the judgment result based on the LSTM-AE model is the final judgment result; or
- if the judgment result based on the LSTM-AE model indicates that the valve is faulty and the judgment result based on the expert experience library indicates that the valve is normal, whether a fault alarm is detected continuously for a period of time and whether a fault occurrence trend exists by, e.g., analyzing past detection data of the first valve, to judge whether the valve is faulty. Specifically, a moment at which the current LSTM-AE model judges that there is an anomaly is used as an initial moment, and data in K consecutive time intervals is taken backward or forward according to a fixed time step T; situations in respective device states in K time periods are predicted based on the LSTM-AE model; and whether there is a true fault is judged according to fault prediction results in K+1 consecutive moments and according to whether a fault situation is continuous.

According to an embodiment of this application, a dual-track check result based on an LSTM-AE and an expert experience library obeys the following rule (as shown in Table 8):

TABLE 8

| Discrimination model | Judgment result | Final judgment result | Final judgment reason |
|---|---|---|---|
| LSTM-AE/expert experience library | Same | Obey the two results | — |
| LSTM-AE/expert experience library | the LSTM-AE judges that there is a fault; the expert experience library judges that there is no anomaly | Perform no judgment temporarily, and perform bidirectional comprehensive judgment forward and backward. | The vibration signal is susceptible to a sudden abnormal vibration. If an instantaneous anomaly alarm occurs, whether there is a true fault should be judged by continuously recognizing for a period of future time from the judgment point whether a fault alarm continuously proceeds and judging whether there is a fault occurrence trend in the past from the judgment point. If the fault continuously alarms and the fault occurrence trend is found, the alarm is comprehensively judged as a fault, or otherwise recognized as an abnormal fluctuation but not a fault, and a reason for the anomaly is analyzed. |
| LSTM-AE/expert experience library | the LSTM-AE judges that there is no anomaly; the expert experience library judges that there is a fault | Normal | The expert experience has a low tolerance level, and a threshold selected based on the expert experience is far less than a true threshold when an absolute fault case occurs. That is, to ensure reduction of a shutdown risk, a definite conclusion drawn from the expert experience in actual operations is that there is an absolute fault advance amount. This situation is subject to a model prediction result. |

Therefore, for the foregoing five groups of false negative experimental data (that is, experimental data from which the LSTM-AE model judges there is a fault) tested based on the LSTM-AE model, two groups of data are discriminated as normal by the expert experience library. Therefore, the LSTM-AE model further continuously recognizes whether a fault alarm continuously proceeds for a period of future time from the judgment point and judges whether there is a fault occurrence trend in the past from the judgment point, and the two groups of data are finally judged as normal according to a comprehensive check result of the LSTM-AE model and the expert experience library. The other three groups of false negative experimental data are judged as abnormal by the expert experience library. It can be seen that the three groups of data cannot be used for performing accurate fault recognition.

It can be known through the foregoing result that, precision of the prediction result is further improved with the aid of the expert experience library. Therefore, the dual-track check manner based on the LSTM-AE and the expert experience library has relatively high prediction accuracy and practicability for valve fault recognition at a hydraulic end of a fracturing device.

Therefore, through the dual-track check detection model based on the LSTM-AE model and the expert experience library of this application, prediction accuracy is higher, a misjudgment risk is smaller, and an actual applicability is stronger.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. References to the memory, the storage, the database, or another medium used in the embodiments provided in this application may all include a non-volatile memory and a volatile memory. The non-volatile memory may include a ROM, a programmable ROM (PROM), an electrically programmable ROM (EPROM), an electrically erasable programmable ROM (EEPROM), or a flash memory. The volatile memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDR SDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The foregoing are merely embodiments of this application and are not intended to limit this application. For a person skilled in the art, this application may have various modifications and changes. A person skilled in the art may make various modifications and changes to this application. Any modification, equivalent replacement, or improvement made without departing from the spirit and principle of this application shall fall within the protection scope of this application.

What is claimed is:

1. A method for detecting faults of valves in a pump, the method comprising:
    detecting vibration signals with one or more vibration sensors mounted on a first valve;
    calculating time-domain statistical indicators of time-domain characteristics of the vibration signals;
    calculating frequency-domain indicators of frequency spectrum difference characteristics of the vibration signals;
    storing the time-domain statistical indicators and the frequency-domain indicators in a database of valve fault indicators;
    establishing a long short-term memory network-aggregate expenditure (LSTM-AE) model by using an LSTM deep model and according to an autoencoder principle, and setting a fault discrimination threshold;
    inputting a pre-collected database of valve fault indicators as training data into the LSTM-AE model to train the LSTM-AE model; and
    inputting the database of valve fault indicators of the first valve into the trained LSTM-AE model, and comparing an output value obtained by the trained LSTM-AE model with the fault discrimination threshold, to judge whether the first valve is faulty, and outputting a first judgment result indicating whether the first valve is faulty.

2. The method according to claim 1, further comprising:
    performing sensitivity comparison on the time-domain statistical indicators to obtain valve fault sensitive statistical indicators;
    screening the frequency-domain indicators to select a frequency-domain characteristic indicator by calculating a frequency-domain energy sum and a frequency-domain energy sum ratio of the frequency-domain indicators of the vibration signals; and
    constructing the database of valve fault indicators based on the valve fault sensitive statistical indicators and the frequency-domain characteristic indicator.

3. The method according to claim 1, further comprising:
    storing in an expert experience library text data comprising a valve structure routine maintenance log, a device maintenance specification, an after-sales maintenance record, and/or a technician experience summary for the first valve;
    processing the text data in the expert experience library into a normalized text;
    judging whether maintenance for the first valve is due according to the expert experience library, and outputting a second judgment result; and
    obtaining, based on the first judgment result and the second judgment result, a final judgment result for judging whether the first valve is faulty.

4. The method according to claim 3, further comprising:
    outputting the first judgment result or the second judgment result as the final judgment result if the first judgment result is the same as the second judgment result.

5. The method according to claim 3, further comprising:
    outputting the first judgment result as the final judgment result if the first judgment result indicates that the first valve is normal and the second judgment result indicates that the first valve is faulty.

6. The method according to claim 3, further comprising:
    in response to that the first judgment result indicates that the first valve is faulty and the second judgment result indicates that the first valve is normal, determining whether a fault of the first valve is detected continuously for a period of time.

7. The method according to claim 6, further comprising:
    in response to determining that the fault is detected continuously for the period of time, judging that the first valve is faulty as the final judgment result.

8. The method according to claim 2, wherein the valve fault sensitive statistical indicators comprise a kurtosis indicator, a root mean square value, a peak indicator, and a pulse indicator.

9. The method according to claim 2, wherein the valve fault sensitive statistical indicators comprise a root mean square value, a peak indicator, a pulse indicator, and a skewness indicator.

10. The method according to claim 1, wherein the setting a fault discrimination threshold comprises:
    setting a threshold interval [err_train_min, err_train_max*1000], wherein err_train_min represents a minimum mean square error of the training data, and err_train_max represents a maximum mean square error of the training data;
    dividing the threshold interval at equal intervals, extracting thresholds one by one based on the threshold interval, and calculating values of evaluation indicators AUC and F1 of the LSTM-AE model when the thresholds are extracted; and determining a value or value range of the fault discrimination threshold according to the evaluation indicators AUC and F1.

11. The method according to claim 1, wherein the calculating time-domain statistical indicators of time-domain characteristics of the vibration signals comprises:

constructing the time-domain statistical indicators by calculating indicators comprising a mean value, an absolute mean value, a variance, a standard deviation, a square root amplitude, a root mean square value, a peak, a maximum value, a minimum value, a waveform indicator, a peak indicator, a pulse indicator, a margin indicator, a skewness indicator, and a kurtosis indicator for the time-domain characteristics of the vibration signals.

12. The method according to claim 1, wherein the calculating frequency-domain indicators of frequency spectrum difference characteristics of the vibration signals comprises:

performing Ensemble Empirical Mode Decomposition (EEMD) on the vibration signals, to obtain a plurality of intrinsic mode function (IMF) components; and performing fast Fourier transform (FFT) on the IMF components, to obtain component frequency-domain signals.

13. The method according to claim 12, further comprising:

calculating a frequency-domain energy sum and for each IMF component, a frequency-domain energy sum ratio of an energy sum of the IMF component to the frequency-domain energy sum; and ranking the component frequency-domain signals according to the frequency-domain energy sum ratio.

14. A computer device, comprising a memory and a processor, wherein the memory stores a computer program executable on the processor, and the processor, when executing the computer program, performs operations comprising:

receiving vibration signals from one or more vibration sensors mounted on a first valve;

calculating time-domain statistical indicators of time-domain characteristics of the vibration signals;

calculating frequency-domain indicators of frequency spectrum difference characteristics of the vibration signals;

storing the time-domain statistical indicators and the frequency-domain indicators in a database of valve fault indicators;

establishing a long short-term memory network-aggregate expenditure (LSTM-AE) model by using an LSTM deep model and according to an autoencoder principle, and setting a fault discrimination threshold;

inputting a pre-collected database of valve fault indicators as training data into the LSTM-AE model to train the LSTM-AE model; and inputting the database of valve fault indicators of the first valve into the trained LSTM-AE model, and comparing an output value obtained by the trained LSTM-AE model with the fault discrimination threshold, to judge whether the first valve is faulty and outputting a first judgment result indicating whether the first valve is faulty.

15. The computer device according to claim 14, wherein the operations further comprises:

performing sensitivity comparison on the time-domain statistical indicators to obtain valve fault sensitive statistical indicators;

screening the frequency-domain indicators to select a frequency-domain characteristic indicator by calculating a frequency-domain energy sum and a frequency-domain energy sum ratio of the frequency-domain indicators of the vibration signals; and constructing the database of valve fault indicators based on the valve fault sensitive statistical indicators and the frequency-domain characteristic indicator.

16. The computer device according to claim 14, wherein the operations further comprise:

storing in an expert experience library text data comprising a valve structure routine maintenance log, a device maintenance specification, an after-sales maintenance record, and/or a technician experience summary for the first valve;

processing the text data in the expert experience library into a normalized text;

judging whether maintenance for the first valve is due according to the expert experience library, and outputting a second judgment result; and obtaining, based on the first judgment result and the second judgment result, a final judgment result for judging whether the first valve is faulty.

17. A non-transitory computer-readable storage medium, storing a computer program, wherein the computer program, when executed by a processor, causes the processor to perform operations comprising:

receiving vibration signals from one or more vibration sensors mounted on a first valve;

calculating time-domain statistical indicators of time-domain characteristics of the vibration signals;

calculating frequency-domain indicators of frequency spectrum difference characteristics of the vibration signals;

storing the time-domain statistical indicators and the frequency-domain indicators in a database of valve fault indicators;

establishing a long short-term memory network-aggregate expenditure (LSTM-AE) model by using an LSTM deep model and according to an autoencoder principle, and setting a fault discrimination threshold;

inputting a pre-collected database of valve fault indicators as training data into the LSTM-AE model to train the LSTM-AE model; and inputting the database of valve fault indicators of the first valve into the trained LSTM-AE model, and comparing an output value obtained by the trained LSTM-AE model with the fault discrimination threshold, to judge whether the first valve is faulty and outputting a first judgment result indicating whether the first valve is faulty.

* * * * *